United States Patent [19]

Cohn et al.

[11] 4,337,458

[45] Jun. 29, 1982

[54] DATA ENCODING METHOD AND SYSTEM EMPLOYING TWO-THIRDS CODE RATE WITH FULL WORD LOOK-AHEAD

[75] Inventors: Martin Cohn, Arlington, Mass.; George V. Jacoby, Los Altos; Charles A. Bates, III, San Jose, both of Calif.

[73] Assignee: Sperry Corporation, New York, N.Y.

[21] Appl. No.: 122,632

[22] Filed: Feb. 19, 1980

[51] Int. Cl.³ .......................................... H03K 13/24
[52] U.S. Cl. ............................. 340/347 DD; 360/40
[58] Field of Search ................... 340/347 DD; 360/40

[56] References Cited

U.S. PATENT DOCUMENTS 3,374,475  3/1968  Gabor ................................ 360/40
3,564,557  2/1971  Ruthazer ..................... 340/347 DD
3,906,485  9/1975  Hong .......................... 340/347 DD

FOREIGN PATENT DOCUMENTS 575677  11/1977  U.S.S.R. .............................. 360/40

OTHER PUBLICATIONS

Takasaki, "IEEE Trans. on Communications", vol. COM-24, No. 4, Apr. 1976, pp. 404-413.

Gabor, "IEEE Trans. on Electronic Computers", Dec. 1967, pp. 866-868.
Horiguchi, "IEEE Trans. on Magnetics", vol. MAG-12, No. 6, Nov. 1976, pp. 740-742.

Primary Examiner—Charles D. Miller
Attorney, Agent, or Firm—Thomas H. Olson

[57] ABSTRACT

A method and apparatus for encoding binary data in a data stream so as to increase the number of data bits represented by one transition, such as a transition recorded on a magnetic medium, and thereby increase the storage density. The data stream is converted into words each having m bits. Two of the data words are stored so as to be simultaneously accessible to a converting system that converts the data words into code words wherein each code word has n bits. In the invention, $m/n = \frac{2}{3}$. In order to increase the space between adjacent transitions, the conversion is carried out according to a scheme wherein all code words have at least one binary ONE and lack successive binary ONEs except certain cases in which a code word is converted to all ZEROs to avoid ONEs in the nth bit of a given code word and the first bit of the code word following the given code word. Also described is a decoding method and apparatus for recovering the encoded data and decoding it to the original binary data.

7 Claims, 4 Drawing Figures

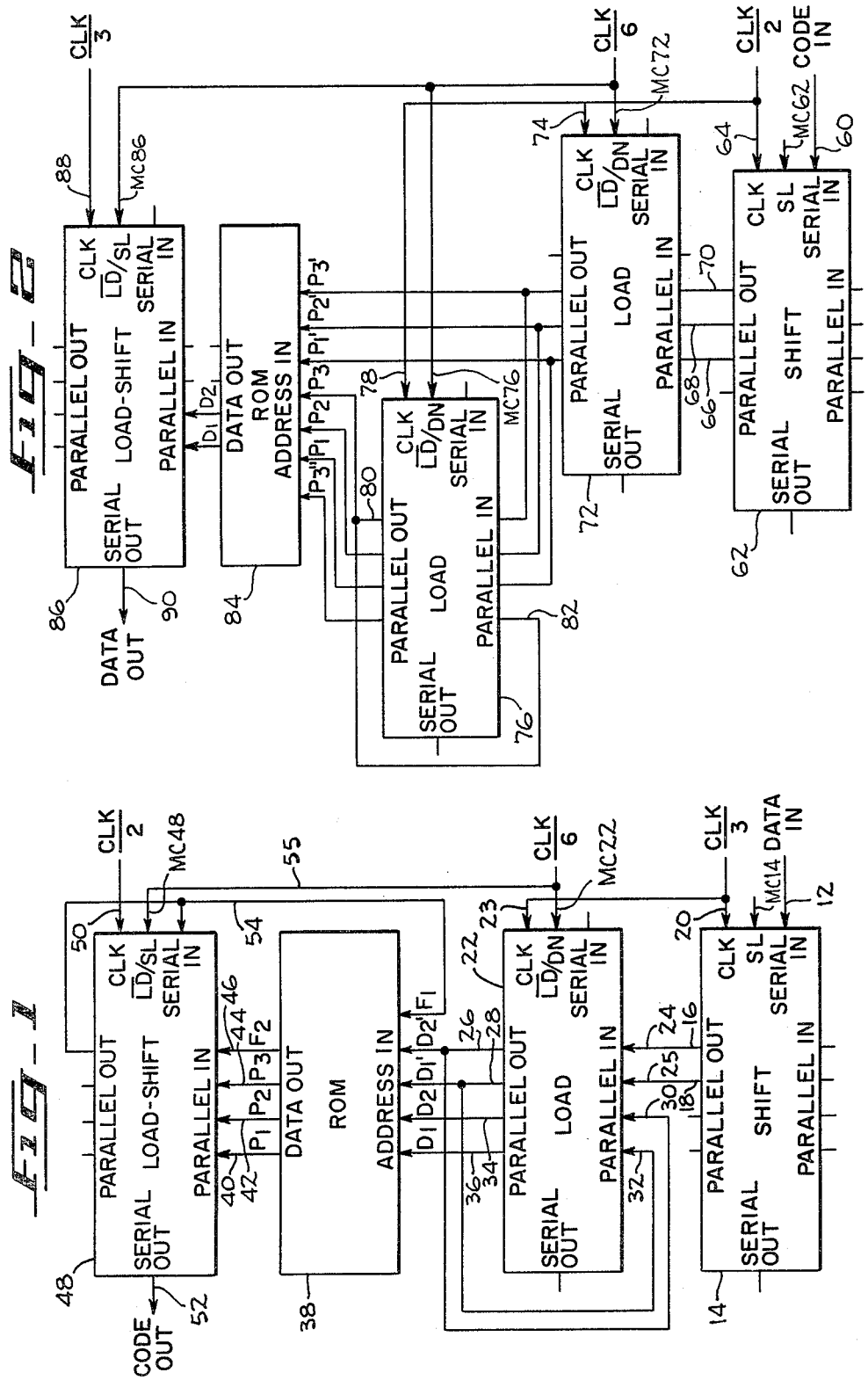

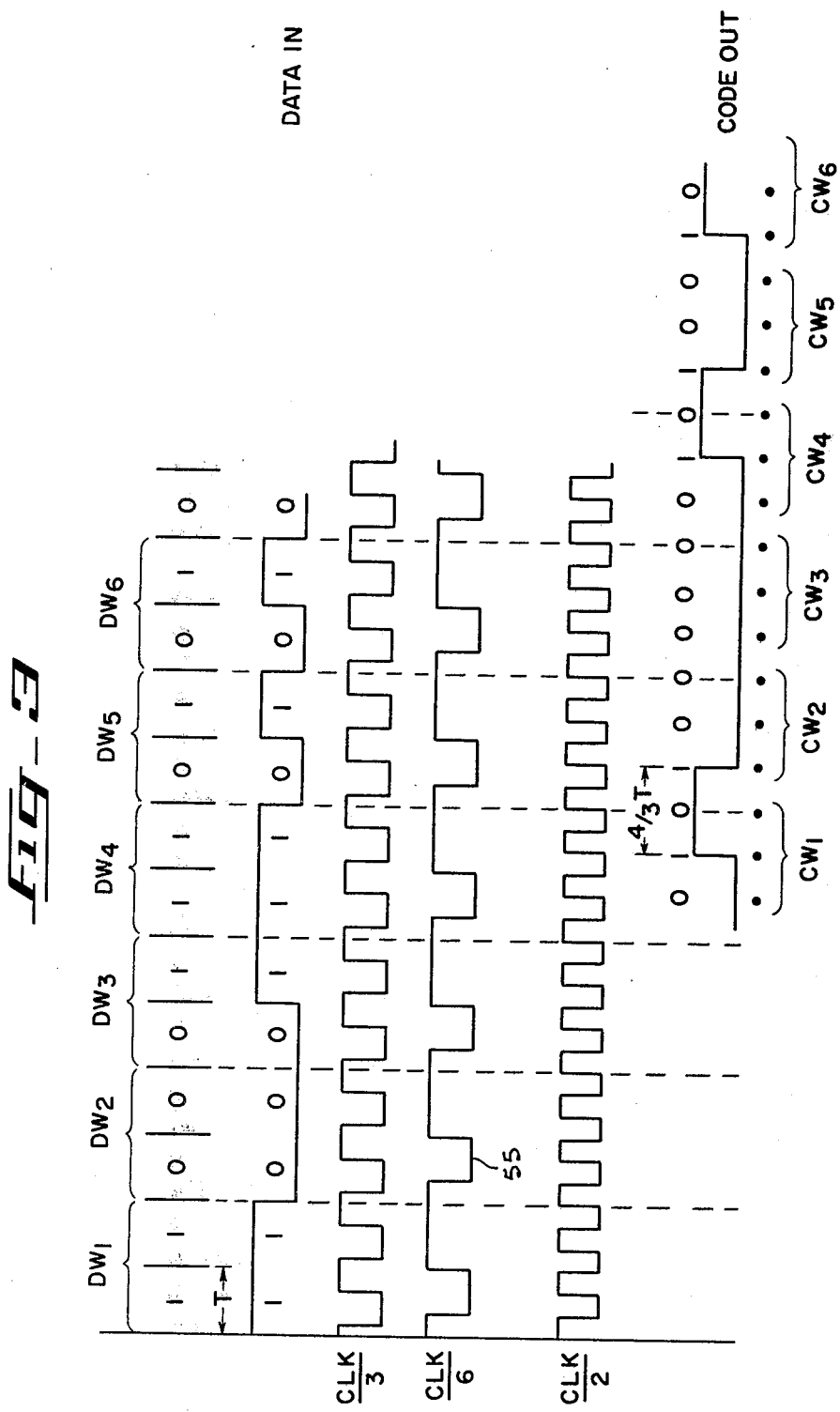

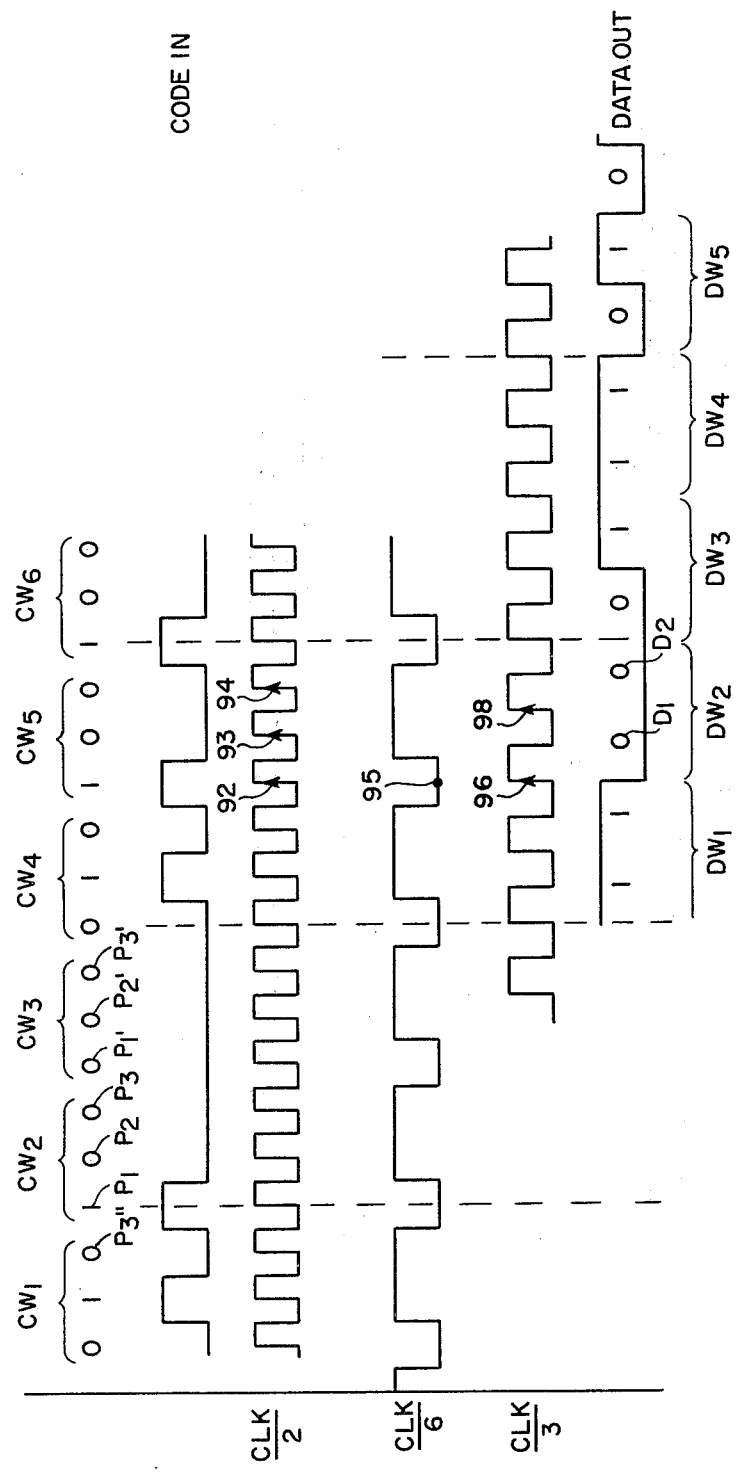

DATA ENCODING METHOD AND SYSTEM EMPLOYING TWO-THIRDS CODE RATE WITH FULL WORD LOOK-AHEAD

BACKGROUND OF THE INVENTION

1. Field of the Invention

This invention relates to a method and system for encoding data prior to transmission of the data to a medium of limited band width, such as a magnetic medium, in order to increase the average number of data bits represented by one signal transition.

2. Description of the Prior Art

U.S. patent application Ser. No. 705,119, filed July 14, 1976 and entitled *METHOD AND APPARATUS FOR ENCODING AND RECOVERING BINARY DIGITAL DATA* contains a comprehensive summary of the known techniques for recording data on a magnetic medium and encoding systems useful in connection therewith. A similar summary is contained in an article titled "A New Look-Ahead Code for Increased Data Density" by George V. Jacoby and published in the IEEE Transactions on Magnetics, volume MAG-13, No. 5, September, 1977, page 1202 et seq.

Another overview of data encoding techniques for maximizing data storage density on a magnetic recording medium is contained in an article titled "An Optimization of Modulation Codes in Digital Recording" by T. Horiguchi et al and published in the IEEE Transactions on Magnetics, volume MAG-12, No. 6, November, 1976 at page 740 et seq. The Horiguchi article discloses a two-thirds rate code which in implementation is relatively complex because it employs variable word lengths.

SUMMARY OF THE PRESENT INVENTION

According to the present invention, serially occurring binary data is grouped into a pair of data words wherein each data word contains m data bits, m in this code being equal to 2. The first data word, sometimes referred to hereinafter as "the present data word," is encoded into a code word having n code bits wherein n is equal in this case to 3/2 m or 3. The conversion is performed in accordance with a scheme wherein each code word has at least one binary ONE but never contains successive binary ONEs. Such conversion, however, is made only when referenced to the data word succeeding the present word, referred to hereinafter as "the succeeding data word," so as to avoid production of concatenate code words wherein the third bit of the present code word and the first bit of the succeeding code word both contain binary ONEs. If the present and succeeding code words would result in successive binary ONEs, then the present word is converted on a substitution basis in accordance with the aforementioned conversion, maintaining the aforementioned conversion guidelines, and a flag signal is produced; the flag signal then operates to encode the succeeding data word as n binary ZEROs thus assuring that the encoded data never contains two successive binary ONEs.

Binary ONEs in the encoded signal are converted by conventional circuitry into signal transitions, and binary ZEROs are manifested as a lack of a transition so that high density is achieved while minimizing bit shift on readout due to pulse crowding, a well understood and documented limitation in the magnetic recording art.

An object of the present invention is to provide an encoding system which enhances the density of magnetic recording by increasing the average number of data bits that are represented by a transition. This object is achieved in accordance with the present invention because the encoding scheme is arranged to avoid the existence of successive binary ONEs in the encoded signal.

Another object of the present invention is to provide an encoding system which can be implemented with a minimum number of circuit elements. This object is achieved in accordance with the present invention because the length of each code word is constant, and as short as is possible for a rate two-thirds or higher.

A feature and advantage of the present invention is that the width or duration of the time window employed in recovering the recorded data is relatively wide so that bit shifts, which arise when maximize recording density is approached, will be detected at the proper time notwithstanding a degree of bit shift.

A further object of the present invention is to provide an encoding system having a short maximum error burst length. In the magnetic recording art error bursts are inevitable and occur because of such reasons as the existence of a noise pulse which is erroneously detected as a data signifying transition. Because the encoding scheme of the invention operates to produce code words of a fixed length and because the significance of each code word depends on no more than one adjacent code word, a maximum of 2 and ½ data words (equivalent to five data bits) are jeopardized by an error burst.

The foregoing, together with other objects, features and advantages will be more apparent after referring to the following specification and the accompanying drawings.

BRIEF DESCRIPTION OF THE DRAWINGS

FIG. 1 is a block diagram of an encoding system in accordance with the present invention.

FIG. 2 is a block diagram of a decoding system in accordance with the present invention.

FIG. 3 is a timing diagram showing operation of the encoding system of FIG. 1.

FIG. 4 is a timing diagram showing operation of the decoding system of FIG. 2.

DETAILED DESCRIPTION OF A PREFERRED EMBODIMENT

Before describing the embodiment of the invention in conjunction with the accompanying drawings, the conceptual basis underlying the invention will be described. The scheme used for converting the data signal into a code signal groups the binary data stream to be encoded into data words of uniform length of m bits. Each data word can have one of the following four values: 00, 01, 10, 11. The scheme employed in practicing the present invention converts the foregoing data words into 3 bit code words. A satisfactory conversion scheme is shown in the following table:

TABLE 1

| Data Word | Code Word |
|---|---|
| 0 0 | 1 0 1 |
| 0 1 | 1 0 0 |
| 1 0 | 0 0 1 |
| 1 1 | 0 1 0 |

It can be seen from the above table that each code word has at least one binary ONE and lacks successive binary ONEs so that a transition on a magnetic medium corresponding to each binary ONE in the code word will be spaced from the next transition by at least one space because no transitions occur in response to a binary ZERO in the code word.

In certain cases, encoding of the data in accordance with the scheme exemplified in the above table will, unless modified, produce successive binary ONEs in the encoded signal. Of the sixteen possible groupings of four data bits (two data words), four groupings would, without modification, produce successive binary ONEs as can be seen in the following table:

TABLE 2

| Data Word Sequence | | Tentative Code Word Sequence | |
|---|---|---|---|
| Present | Succeeding | Present | Succeeding |
| 0 0 | 0 0 | 1 0 1 | 1 0 1 |
| 0 0 | 0 1 | 1 0 1 | 1 0 0 |
| 1 0 | 0 0 | 0 0 1 | 1 0 1 |
| 1 0 | 0 1 | 0 0 1 | 1 0 0 |

It will be observed that the bridges between the tentative code words in the above table, i.e., the third position of the present code word and the first position of the succeeding code word, contain successive binary ONEs.

In accordance with the present invention, substitutions are made prior to encoding the data words and supersede conversion according to the scheme exemplified by above Table 1. Such substitution eliminates successive ONEs in the bridges and can be performed in accordance with the following table:

TABLE 3

| Data Word Sequence | | Actual Code Word Sequence | |
|---|---|---|---|
| Present | Succeeding | Present | Succeeding |
| 0 0 | 0 0 | 1 0 1 | 0 0 0 |
| 0 0 | 0 1 | 1 0 0 | 0 0 0 |
| 1 0 | 0 0 | 0 0 1 | 0 0 0 |
| 1 0 | 0 1 | 0 1 0 | 0 0 0 |

It will be seen in each of the above pairs of code words that the succeeding code word is composed of three binary ZEROs. Such code word is sometimes referred to hereinafter as a "flag."

The foregoing substitution is performed without difficulty in accordance with the present invention because two data words are stored so as to be simultaneously accessible before the present data word is encoded. This permits substitution of the present data word in two of the four cases indicated by Table 3, a substitution that is necessary to preserve uniqueness of the encoded words and to avoid any ambiguity.

In decoding the code words to recreate accurately the original data words, two and one-third code words (i.e. seven code bits) are stored so as to detect those cases in which substitution was made during encoding and achieve accurate decoding to the original data bits.

In actual implementation of the invention the substitutions denoted in the above tables are made by reference to the data words; consequently hereinafter the code words in Table 2 are sometimes referred to as "tentative code words" because they are not actually produced in circuitry of the invention. One satisfactory manner of implementing the substitution, which is described hereinbelow in connection with the circuits shown in the drawings, is achieved in accordance with the following table:

TABLE 4

| DATA WORDS | | | CODE WORD | |
|---|---|---|---|---|
| $(D_1D_2)$ Present Word | $(D'_1D'_2)$ Succeeding Word | $F_1$ Flag In | $(P_1P_2P_3)$ Encode Word | $F_2$ Flag Out |
| 0 0 | 0 0 | 0 | 1 0 1 | 1 |
| 0 0 | 0 1 | 0 | 1 0 0 | 1 |
| 0 0 | 1 N | 0 | 1 0 1 | 0 |
| 0 1 | N N | 0 | 1 0 0 | 0 |
| 1 0 | 0 0 | 0 | 0 0 1 | 1 |
| 1 0 | 0 1 | 0 | 0 1 0 | 1 |
| 1 0 | 1 N | 0 | 0 0 1 | 0 |
| 1 1 | N N | 0 | 0 1 0 | 0 |
| N N | N N | 1 | 0 0 0 | 0 |

NOTE:
N means Not Care

The left-hand portion of Table 4 (under "DATA WORDS") represents the input to circuitry described hereinafter, and the right-hand portion of Table 4 (under "CODE WORD") represents the output of such circuitry. As can be seen in Table 4, when a substitution is made in encoding a present data word into a present code word, a flag signal is produced and causes the succeeding code word to take the form of three binary ZEROs. It can also be seen that in the right-hand column ("Flag Out"), the rows that contain a "1" correspond to the words contained in Table 3.

The code words tabulated under "Encode Word" are serially fed to a system of limited band width, such as a system which may include, for example, a magnetic medium and a read/write transducer for recording transitions on the medium in response to a ONE in a code word and for reproducing previously recoded transitions. Because occurrence of successive ONEs is avoided in the encoded word, occurrence of closely spaced transitions is similarly avoided.

The recorded code words can be read from the medium and must be decoded to recover the original data. In order to decode the recorded transitions, seven code bits are stored, namely the last bit of the previous code word and all bits of the present and succeeding code word. The operation of a suitable decoding scheme can be discerned from the following table:

TABLE 5

| CODE WORDS | | | DATA WORD |
|---|---|---|---|
| $(P''_3)$ Previous Position | $(P_1P_2P_3)$ Present Word | $(P'_1P'_2P'_3)$ Succeeding Word | $(D_1D_2)$ Decode Word |
| N | 1 0 1 | X X X | 0 0 |
| N | 1 0 0 | X X X | 0 1 |
| N | 0 0 1 | X X X | 1 0 |
| N | 0 1 0 | X X X | 1 1 |
| N | 1 0 1 | 0 0 0 | 0 0 |
| N | 1 0 0 | 0 0 0 | 0 0 |
| N | 0 0 1 | 0 0 0 | 1 0 |
| N | 0 1 0 | 0 0 0 | 1 0 |
| 0 | 0 0 0 | N N N | 0 1 |
| 1 | 0 0 0 | N N N | 0 0 |

NOTE:
X X X means Not All Zeros
N means Not Care

Thus it will be seen that decoding of the present code word can be performed without ambiguity because the last bit of the previous code word and all bits in the succeeding code word are simultaneously accessible.

Referring to FIG. 1, the stream of binary data is applied to a serial input terminal 12 of a shift register 14. The data bits occur at a rate having a period T, which in a typical disc storage unit is established by a phase locked oscillator (PLO) that is synchronized to the speed of disc rotation. A clock frequency based on the PLO frequency is referred to in the ensuing description as CLK; the frequency at which the data bits occur at input 12 is one-third the clock frequency, i.e., $1/T = CLK/3$. Shift register 14 forms the data words which consist of two binary bits in the specific embodiment shown in the drawing. Shift register 14 exemplifies other shift registers used in encoding and decoding the data and can be embodied by any suitable device, such as a type 74194 bidirectional universal shift register. Such shift register includes mode inputs for receiving control signals which cause the shift register to operate in one of four modes: (1) no change, (2) shift left, (3) shift right and (4) load parallel. Because generation of such mode control signals is well understood by those skilled in the art, no description of the generation of the mode control signals will be given. Although a shift register typically has a pair of inputs to afford establishment of one of the four modes of operation, a single mode control input identified by reference characters MC followed by the number that identifies the shift register is sufficient for present purposes. Thus shift register 14 has a mode control input MC14. All shifts and loads (transfers) are assumed to be performed on the positive transition of the clock input to the respective shift register. Input MC14 is connected such that shift register 14 is continuously in a shift left mode. Data applied at serial input 12 is transferred to output 16 and data at output 16 is transferred to output 18. The transfers are performed in response to the clock signal CLK/3 applied to the clock input 20. Serially occurring binary data applied to input 12 is thus converted to data words having $m=2$ bits.

Shift register 22 is substantially identical to shift register 14 but utilizes the parallel inputs thereof rather than the serial input. Shift register 22 has a clock input 23 to which clock signal CLK/3 is connected. The shift register has a mode control input MC22 to which clock signal CLK/6 is connected. The level of the input to mode control input MC22 determines the response of the shift register to the appearance of a clock signal at clock input 23. If mode control input MC22 is a logic low, data present at the parallel inputs of the shift register is entered or loaded into the shift register; if the mode control input is a logic high, data at the parallel inputs are ignored. Thus, if mode control input MC22 is supplied with a logic low, the data at inputs 24 and 25 are transferred to parallel outputs 26 and 28 and at the same time the data at parallel inputs 30 and 32 are transferred to parallel outputs 34 and 36. If mode control input MC22 is supplied with a logic high, however, no data transfer occurs. Parallel outputs 26 and 28 are fed back to parallel inputs 30 and 32 so that shift registers 14 and 22 coact to convert serial data applied to input 12 of shift register 14 into parallel data taken two bits (one data word) at a time.

When a succeeding data word is applied by shift register 14 to shift register 22 and clocked through the latter shift register, there appears at the output of shift register 22 two binary bits representing a present data word on outputs 34 and 36 and two binary bits representing a succeeding data word on outputs 26 and 28. Such data words are simultaneously accessible to the input of a gating or converting circuit exemplified here by a read only memory (ROM) element 38. ROM 38 functions to convert data words into code words in accordance with the scheme shown in Table 4.

In the drawings the inputs to ROM 38 are labeled $D_1$ and $D_2$ which identify the first and second bits of the present data word and $D_1'$ and $D_2'$ which indicate the first and second data bits of the succeeding data word. In addition, there is an input identified by $F_1$ for a flag bit which forces the encoding of all binary ZEROs in the code word formed at the output of circuit 38. The outputs of converting circuit 38 consist of three bits, which constitute the code word and are identified as $P_1$, $P_2$ and $P_3$, as well as a flag bit $F_2$. The outputs are connected over circuit paths 40, 42, 44 and 46 to the parallel inputs of an output shift register 48. Shift register 48 is substantially identical to shift registers 14 and 22 and is arranged to serialize data that is applied to its parallel inputs. Shift register 48 has a mode control input MC48 to which is applied the same signal CLK/6 as is applied to mode control input MC22 of shift register 22. The signal applied to mode control input MC48 causes the code word present at outputs $P_1$, $P_2$ and $P_3$ of ROM 38 to be entered once for each data word and at all other times to be shifted left as a clock pulse CLK/2 is fed to the clock input 50 of shift register 48. The clock signal fed to clock input 50 thus occurs at a rate that is 3/2 that of the rate at which data is supplied to the encoding circuit at input 12. Accordingly, the encoded word represented by code bits $P_1$, $P_2$ and $P_3$ is produced in serial form at the output 52 of shift register 48 in response to clock signal CLK/2 applied to the clock input of the shift register. Additionally, a flag output appears at parallel output terminal 53 of the shift register and is fed back on a circuit path 54 to form input $F_1$ of the converting circuit constituted by ROM 38. Circuit path 54 is also connected to the serial input of shift register 48 so as to maintain the flag in the same position in the shift register during the shift mode.

The operation of the encoding circuit of FIG. 1 will be summarized having reference to the timing diagram of FIG. 3. The upper portion of FIG. 3 indicates an exemplary data stream applied to input terminal 12, the second curve showing the data in NRZ format. In the exemplary data stream shown in FIG. 3 the first two data bits are binary ONEs and are sequentially clocked into shift register 14 by the rising edges of CLK/3. In response to the low state of CLK/6 indicated at 55 in FIG. 3, the first or present data word $DW_1$ is loaded to outputs 26 and 28 of shift register 22 and fed back to inputs 30 and 32 thereof.

The succeeding data word $DW_2$ in a similar manner is applied through shift register 14 to inputs 24 and 25 of shift register 22 so that on the next low state applied by CLK/6 to mode control terminal MC22, there appears on the outputs of shift register 22 data word $DW_1$ on outputs 34 and 36 and data word $DW_2$ on outputs 26 and 28. The resultant four bits $D_1$, $D_2$, $D_1'$ and $D_2'$ are applied as inputs to ROM 38 and are converted by the ROM, in accordance with the scheme represented by Table 4, to three position or code bits $P_1$, $P_2$ and $P_3$. Such code bits are serialized by shift register 48 at a rate of CLK/2 to produce a code word $CW_1$ which accords with the scheme established by ROM 38.

The third data word $DW_3$ then becomes the succeeding word at inputs $D_1'$ and $D_2'$ of ROM 38 and data word $DW_2$ becomes the present word at inputs $D_1$ and $D_2$ of the ROM. As indicated in the tentative encoding shown in Table 2, incipient successive binary ONEs arise, but ROM 38 makes the conversion in accordance with Table 4 and simultaneously produces a flag signal at ROM output $F_2$. Thus data word $DW_2$ is encoded as code word $CW_2$ as 1 0 0.

Next $DW_4$ appears at ROM inputs $D_1'$ and $D_2'$ as the successive word and data word $DW_3$ appears at ROM inputs $D_1$ and $D_2$ as the present word. Additionally, a flag signal applied at ROM input $F_1$ causes the ROM outputs $P_1$, $P_2$ and $P_3$ to produce all binary ZEROs, irrespective of the signals applied to the other ROM inputs. Consequently, data word $DW_3$ is encoded as three ZEROs in code word $CW_3$. It can be seen from the last line of the timing diagram in FIG. 3 that the minimum time between signal transitions is 4/3 T in consequence of which the encoding system of the invention affords improved storage density notwithstanding the physical limitations of the medium.

The decode scheme set forth in Table 5 can be implemented by means of the circuitry shown in FIG. 2. The input of the decoding circuitry is constituted by the serial input terminal 60 of a shift register 62 which is similar to the shift registers referred to above and functions to convert the serially occurring code bits into parallel words so that three code bits are simultaneously accessible. In reading the encoded data from a magnetic medium or the like, a transition represents a binary ONE and the lack of transition represents a binary ZERO. Circuitry not shown produces a time window having a width or duration equal to $\frac{2}{3}$ T within which window a transition is representative of a binary ZERO. Shift register 62 is clocked at a rate CLK/2 applied to its clock input 64; the shift register also has a mode control input MC62 which shifts left the incoming serial bits until three such bits are present at the parallel outputs of shift register 62. Thus at the outputs 66, 68 and 70 of shift register 62 there appears the three bits of a code word.

The code word so produced at the output of shift register 62 is applied to the parallel inputs of a shift register 72 which is substantially identical to the shift registers described above. Shift register 72 has a clock input 74 to which CLK/2 is connected. A mode control input MC72 is fed by CLK/6 so that when the latter clock signal is low, three code bits appear simultaneously at the outputs of the shift register on the next positive CLK/2 edge.

The code bits produced at the output of shift register 72 as described above are applied to the inputs of a shift register 76 which is substantially identical to the shift registers described previously. Shift register 76 has parallel inputs and parallel outputs and functions to store a code word while the succeeding code word is stored by shift register 72, having been deserialized by register 62. Shift register 76 has a mode control input MC76 which is connected in common with mode control input MC72 of shift register 72 in consequence of which shift register 76 loads the parallel inputs thereof upon the occurrence of each code word as dictated by CLK/6 and CLK/2. Shift register 76 has a clock input 78 to which CLK/2 is applied. Finally, shift register 76 has a parallel output terminal 80 at which the last code bit in a code word appears; the code bit appearing on output 80 is fed back to the opposite parallel input 82 so that when a new code word is loaded to the outputs of shift register 76 the last bit of the preceding code word is simultaneously loaded to the output. The functions of shift registers 62, 72 and 76 are to convert serial code to parallel code taken three code bits at a time and to store at any given time seven code bits.

The parallel outputs of shift registers 72 and 76 are connected to the inputs of a ROM or converting circuit 84. ROM 84 is constructed and arranged to perform the decoding scheme shown in Table 5. There are seven inputs to ROM 84. Three of the inputs identified as $P_1$, $P_2$ and $P_3$ contain the present code word. Another three inputs identified as $P_1'$, $P_2'$ and $P_3'$ contain the succeeding code word. Input $P_3''$ contains the last bit of the preceding code word. In the present case, n=3 so that on input $P_3''$ the third code bit of the previous code word is applied. The outputs of ROM 84 are constituted by terminals $D_1$ and $D_2$ at which the data word corresponding to the present code word is produced.

The internal connections present in ROM 84 can be appreciated by reference to Table 5. It can be seen that the first four rows in the table correspond to Table 1 in that the present code words displayed in such rows are converted without substitutions. The next four rows in Table 5 correspond substantially to Table 3 in that the next code word appearing on inputs $P_1'$, $P_2'$ and $P_3'$ contain all ZEROs. Consequently substitute decoding is effected. The final two rows in Table 5 cover the case where the present code word contains all binary ZEROs because of a prior substitution to avoid binary ONEs in successive code bits. Thus the outputs $D_1$ and $D_2$ of ROM 84 contain a data word that precisely corresponds to the original data word before encoding. Such data word is applied to the parallel inputs of a shift register 86 which functions to serialize the parallel data bits $D_1$ and $D_2$. Shift register 86 has a clock input 88 to which is supplied the clock signal CLK/3 which corresponds in frequency to that of the data supplied to input 14 of the encode circuit shown in FIG. 1 so that the serial data produced at the output 90 of the shift register occurs at the proper repitition rate. Shift register 86 has a mode control input MC86 which is activated by clock signal CLK/6 and a clock input activated by CLK/3 so as to achieve correct time correspondence between the code words applied to the input of the decoding circuit and the data words produced at the output thereof.

The operation of the decoding circuit of FIG. 2 will be recapitulated in connection with the timing diagram of FIG. 4. At the top of FIG. 4 are shown code words $CW_1$ through $CW_6$ which correspond to the code words shown at the bottom of FIG. 3. In the ensuing example code word $CW_1$ is considered the previous code word so that code bit $P_3''$ is a binary ZERO. Code word $CW_2$ is considered the present word so that code bits $P_1$, $P_2$ and $P_3$ have the values 1 0 0 respectively. Code word $CW_3$ is considered the succeeding code word and the code bits of the succeeding code words $P_1'$, $P_2'$ and $P_3'$ have the values 0 0 0 respectively. From Table 5, specifically the sixth row thereof, it will be seen that code word $CW_2$ is converted to a data word 0 0.

FIG. 4 exemplifies the timing involved with the implementation of the decoder of FIG. 2. Presuming that the code bits have been deserialized by shift registers 62, 72 and 82 as previously described, that the seven code bits of code words $CW_1$, $CW_2$ and $CW_3$ are at the inputs to ROM 84, and that the corresponding data word output of ROM 84 is at the parallel input to serializing shift register 86, then the following typical timing transpires. When mode control CLK/6 95 is low and upon the approximately simultaneous rise of CLK/3 at 96 and CLK/2 at 92, ROM 84 output data bits $D_1$ and $D_2$ are loaded into serializer register 86 ($D_1$ arriving at the serial output 90) while $CW_2$ becomes $CW_1$, $CW_3$ becomes $CW_2$, and $CW_4$ becomes $CW_3$ at the inputs to ROM 84. The mode control CLK/6 then goes high. The next CLK/2 rising edge at 93 does nothing. Then the following CLK/3 rising edge at 98 shifts $D_2$ of serializer register 86 to the serial output 90 (thus serializing the data word). The next CLK/2 rising edge at 94 does nothing again, thereby maintaining the inputs to ROM 84 for one full word time. This same sequence repeats for each succeeding code/data word.

From the foregoing description of the encode circuit of FIG. 1 and the decode circuit of FIG. 2 it will be appreciated that the circuitry for implementing the code employed in the invention is relatively straightforward and uncomplicated. The circuitry can be implemented with readily available circuit elements into a compact, high speed and accurate system. Such system enhances the accuracy and density at which data can be recorded onto a magnetic medium. For example, the window employed in differentiating one recorded magnetic condition from those adjacent to it has a width or duration equal to 0.66T. Such window width is one third wider than the windows produced in the systems disclosed in the IEEE article by Jacoby cited previously. Consequently, for the same recording density on the magnetic medium, the present invention provides improved accuracy, because greater time shifts due to pulse crowding and the like can be tolerated without introducing inaccuracies.

The code employed in the method and system of the invention affords a short maximum error burst length. Errors in recovering data recorded on a magnetic medium can arise from the presence of a noise pulse that will be read as a transition when in fact no transition is present. Because the invention employs code words of fixed length the maximum error burst length resulting from such noise spike is 2.5 data words (five data bits). Finally, the maximum number of successive ZEROs in a stream of code words produced by the present invention is seven, a number sufficiently low that the code of the invention affords reliable self clocking.

Although one embodiment of the invention has been shown and described, it will be apparent that other adaptations and modifications can be made without departing from the true spirit and scope of the invention.

What is claimed is:

1. Apparatus for encoding binary data in the form of serially occurring binary data bits to a series of signal transitions in order to effect high density transmission of data to a limited bandwidth system comprising: means for forming the binary data bits into data words composed of 2 bits, storage means having an input coupled to said data word forming means for sequentially receiving and storing data words from said data word forming means, said storage means having a present data word output and a succeeding data word output and being adapted to shift a data word stored therein to said present data word output in response to input from said data word forming means of a succeeding data word so that a present data word and a succeeding data word are simultaneously accessible at said present data word and succeeding data word outputs respectively, conversion means having inputs coupled to said storage means present data word and succeeding data word outputs for converting said present data word output into a present code word having 3 bits in 3 positions, said conversion means being constructed and arranged in accordance with an encoding scheme to form the present code word to have at least one binary ONE and to lack successive binary ONEs, said conversion means including means for producing a flag signal in response to occurrence of binary ONEs in both the third position of said present code word and the first position of a tentative code word representative in accordance with the encoding scheme of the succeeding data word, means for applying the flag signal to said conversion means during the time when a succeeding data word is applied to said conversion means, means for transmitting said present code word from said conversion means in serial form and for coupling said flag signal to said conversion means simultaneous with introduction of a new data word to said storage means and shifting of the succeeding word to said present data word output, said conversion means being constructed and arranged to form a succeeding code word representative of the succeeding data word at said present data word output so that the succeeding code word is composed of 3 binary ZEROs in response to presence of said flag signal and of 3 code bits according to the encoding scheme in absence of the flag signal, and means for serializing the code words into a series of code bits for transmission to the system.

2. Apparatus according to claim 1 wherein said conversion means has inputs $D_1$ and $D_2$ for receiving the bits of a present data word from said storage means, inputs $D_1'$ and $D_2'$ for receiving the bits of a succeeding data word from said storage means, and flag input $F_1$, said conversion means also having outputs $P_1$, $P_2$ and $P_3$ for producing the bits of a code word and a flag output $F_2$ coupled to said flag input $F_1$, said conversion means producing code bits at said outputs according to the encoding scheme specified by the following table in response to data bits applied to said inputs:

| $D_1D_2$ | $D_1'D_2'$ | $F_1$ | $P_1P_2P_3$ | $F_2$ |
|---|---|---|---|---|
| 0 0 | 0 0 | 0 | 1 0 1 | 1 |
| 0 0 | 0 1 | 0 | 1 0 0 | 1 |
| 0 0 | 1 N | 0 | 1 0 1 | 0 |
| 0 1 | N N | 0 | 1 0 0 | 0 |
| 1 0 | 0 0 | 0 | 0 0 1 | 1 |
| 1 0 | 0 1 | 0 | 0 1 0 | 1 |
| 1 0 | 1 N | 0 | 0 0 1 | 0 |
| 1 1 | N N | 0 | 0 1 0 | 0 |
| N N | N N | 1 | 0 0 0 | 0, | wherein 1 signifies a first binary state, 0 signifies a second binary state different from said first binary state and N signifies that the binary state on an input so designated has no influence on the binary state of the outputs.

3. Apparatus according to claim 2 wherein said data bits occur at a rate of 1/T and wherein said encoding apparatus includes timing means for producing said series of code bits at a rate of $(3/2)\cdot(1/T)$, said encoding scheme operating so that the minimum time between two code bits having a binary value of ONE is (4/3T).

4. Apparatus according to claim 3 wherein said receiving means includes means forming a time window having a duration substantially equal to ($\frac{2}{3}$T) for discriminating between successive code bits.

5. Apparatus according to claim 1 including transmitting means coupled to said code word serializing means for producing a first signal level and a second signal level different from said first signal level and means responsive to a code bit having a binary value of ONE for switching from one said level to the other said level.

6. Apparatus according to claim 1 in combination with means for decoding said code words to said data bits comprising receiving means in receiving relation to the system for converting the code bits into successive code words each having 3 bits, third storage means for storing the third bit of a given code word, fourth storage means for storing all bits of a present code word immediately following said given code word, fifth storage means for storing all bits of a succeeding code word immediately following said present code word so that the third bit of said given code word and all bits of said present and succeeding code words are simultaneously accessible, decoding means having inputs connected to said third, fourth and fifth storage means for converting said present code word to a present data word, said decoding means being constructed and arranged according to a decoding scheme that is the reverse of said encoding scheme and having two outputs at which bits constituting the present data word are produced, and means coupled to said decoding means for serializing the data word into a series of data bits.

7. Apparatus according to claim 6 wherein said decoding means has an input $P_3''$ coupled to said third storage means for receiving the third bit of said given code word, inputs $P_1$, $P_2$ and $P_3$ coupled to said fourth storage means for receiving the bits of said present code word, and inputs $P_1'$, $P_2'$ and $P_3'$ coupled to said fifth storage means for receiving the bits of said succeeding code word, said decoding means having outputs $D_1$ and $D_2$ and being constructed and arranged to produce data bits at said outputs according to the decoding scheme specified by the following table in response to code bits applied to said inputs:

| $P_3''$ | $P_1P_2P_3$ | $P_1'P_2'P_3'$ | $D_1D_2$ |
|---|---|---|---|
| N | 1 0 1 | X X X | 0 0 |
| N | 1 0 0 | X X X | 0 1 |
| N | 0 0 1 | X X X | 1 0 |
| N | 0 1 0 | X X X | 1 1 |
| N | 1 0 1 | 0 0 0 | 0 0 |
| N | 1 0 0 | 0 0 0 | 0 0 |
| N | 0 0 1 | 0 0 0 | 1 0 |
| N | 0 1 0 | 0 0 0 | 1 0 |
| 0 | 0 0 0 | N N N | 0 1 |
| 1 | 0 0 0 | N N N | 0 0, | wherein 1 signifies a first binary state, 0 signifies a second binary state different from said first binary state, N signifies that the binary state on an input so designated has no influence on the binary state of the outputs and XXX signifies that there are not all ZEROs in the code word so identified.

* * * * *